(12) United States Patent
Maddukuri et al.

(10) Patent No.: US 10,788,876 B2
(45) Date of Patent: Sep. 29, 2020

(54) SYSTEM AND METHOD TO MAINTAIN POWER CAP WHILE BASEBOARD MANAGEMENT CONTROLLER REBOOTS

(71) Applicant: DELL PRODUCTS L.P., Round Rock, TX (US)

(72) Inventors: Akkiah Choudary Maddukuri, Austin, TX (US); Arun Muthaiyan, Round Rock, TX (US); Jun Gu, Austin, TX (US); Alexander J. Hoganson, Austin, TX (US); Sayali Prafulla Kesari, Austin, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 124 days.

(21) Appl. No.: 16/047,361

(22) Filed: Jul. 27, 2018

(65) Prior Publication Data

US 2020/0033926 A1 Jan. 30, 2020

(51) Int. Cl.
*G06F 1/28* (2006.01)

(52) U.S. Cl.
CPC ...................................... *G06F 1/28* (2013.01)

(58) Field of Classification Search
CPC ................. G06F 1/26; G06F 1/28; G06F 1/30
USPC .......................................................... 713/340
See application file for complete search history.

(56) References Cited

U.S. PATENT DOCUMENTS

| | | | |
|---|---|---|---|
| 4,365,237 A | 12/1982 | Knight | |
| 7,783,903 B2 | 8/2010 | Piazza | |
| 8,020,167 B2* | 9/2011 | Dube | G06F 1/206 |
| | | | 718/104 |
| 8,321,931 B2 | 11/2012 | Zimmer et al. | |
| 8,713,295 B2 | 4/2014 | Bax et al. | |
| 8,838,286 B2 | 9/2014 | Florez-Larrahondo et al. | |
| 8,843,772 B2* | 9/2014 | Hormuth | G06F 1/28 |
| | | | 713/300 |
| 8,954,784 B2 | 2/2015 | Bower, III et al. | |
| 9,274,581 B2* | 3/2016 | Berke | G06F 1/32 |
| 9,513,642 B2 | 12/2016 | Rogers et al. | |
| 9,740,385 B2 | 8/2017 | Fadell et al. | |
| 9,851,728 B2 | 12/2017 | Matsuoka et al. | |
| 10,078,610 B2* | 9/2018 | Kunnathur Ragupathi | G06F 1/266 |
| 10,409,349 B2* | 9/2019 | Kelly | G06F 11/0757 |
| 2015/0177813 A1* | 6/2015 | Bailey | G06F 1/3234 |
| | | | 713/320 |
| 2015/0177814 A1* | 6/2015 | Bailey | G06F 1/3234 |
| | | | 713/320 |
| 2016/0328349 A1* | 11/2016 | Kunnathur Ragupathi | G06F 13/4068 |

(Continued)

FOREIGN PATENT DOCUMENTS

CA 2793433 4/2016

*Primary Examiner* — Brian T Misiura
(74) *Attorney, Agent, or Firm* — Jackson Walker LLP; Christopher J. Rourk

(57) ABSTRACT

A system for controlling power to a complex system, comprising a plurality of processors, one or more power supply unit, each power supply unit including an overcurrent warning system and a baseboard management controller coupled to the plurality of processors and the one or more power supply unit, wherein the baseboard management controller is configured to determine whether a power cap control has been enabled and to adjust an overcurrent warning threshold of the overcurrent warning system.

15 Claims, 3 Drawing Sheets

(56) References Cited

U.S. PATENT DOCUMENTS

2020/0026344 A1\* 1/2020 Maddukuri ........... G06F 1/3287

\* cited by examiner

SYSTEM AND METHOD TO MAINTAIN POWER CAP WHILE BASEBOARD MANAGEMENT CONTROLLER REBOOTS

TECHNICAL FIELD

The present disclosure relates generally to power control in a complex system, and more specifically to a system and method to maintain a power cap while a baseboard management controller reboots, without reducing the power to the system to a minimum level.

BACKGROUND OF THE INVENTION

Power control of complex systems is complicated by the fact that the different system components have dynamic settings and different responses to system changes. Accordingly, the typical response to a system change, such as a controller reboot, is to reduce the power level of all components, even if it is not necessary.

SUMMARY OF THE INVENTION

A system for controlling power to a complex system, comprising a plurality of processors, one or more power supply unit, each power supply unit including an overcurrent warning system and a baseboard management controller coupled to the plurality of processors and the one or more power supply unit, wherein the baseboard management controller is configured to determine whether a power cap control has been enabled and to adjust an overcurrent warning threshold of the overcurrent warning system.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
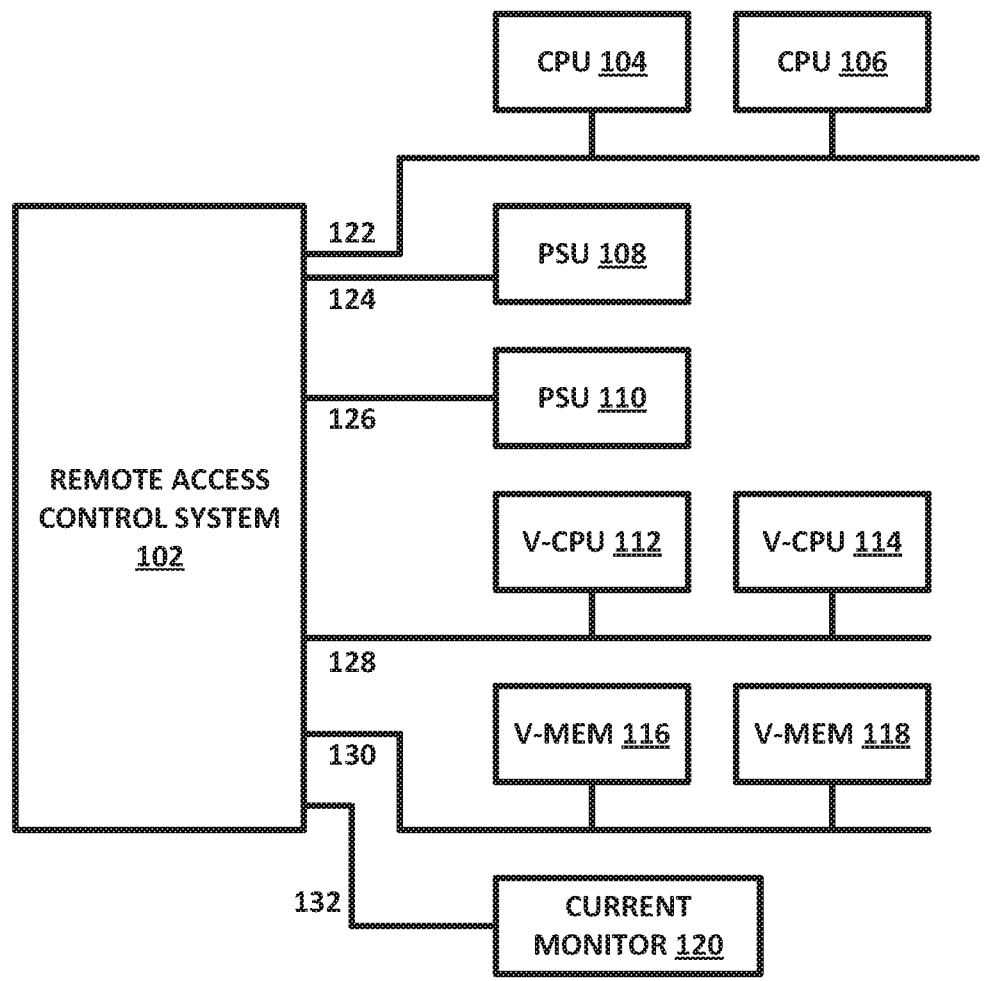
FIG. 1 is a diagram of a system for polling devices over an I2C bus or other suitable buses, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

The capability to apply a maximum power consumption or "power cap" to a device or system within a complex system, like a server, helps to avoid unnecessary circuit breaker activation. Because a circuit breaker activation typically requires a user to manually reset the circuit breaker, reducing the number of unnecessary circuit breaker activation events can improve system reliability and availability, and prevent component malfunction due to circuit breaker operation, such as from system power transients.

In some complex systems such as servers, a device called a baseboard management controller (BMC) can be provided to manage interfaces between system management software and platform hardware. The BMC can maintain a power cap by continuously monitoring the input power provided to power supply units (PSUs) and by reducing the power that is provided to the CPU, memory subsystem or input/output subsystem whenever the PSU power exceeds a requested power cap. However, there is also a need to maintain power during reboot of the BMC. While it is possible to maintain a system power cap during BMC reboot by reducing the power consumption of the system before a reboot starts and to subsequently increase power consumption after reboot is complete, that process can result in unnecessary power reduction.

The present disclosure adjusts the overcurrent warning threshold out of the PSUs before the BMC initiates reboot to avoid inadvertent circuit breaker activations. For example, this PSU feature allows it to send an alert signal whenever the runtime current crosses the set limit. A complex programmable logic device (CPLD) can use that alert signal to protect the system from power excursion above the PSU capacity. In the reset script, the overcurrent warning setting could be modified based on system configuration.

In one example embodiment, the PSU overcurrent warning threshold can be set using an algorithm that functions based on predetermined conditions, such as whether a hot spare is enabled. If so, then the hot spare is disabled and the algorithm continues. If a user cap is disabled, then the algorithm exits. When the controller boots back up, it can re-enable the hot spare, thus preventing the hot spare from inadvertently remaining disabled. In this example embodiment, the following algorithm can be used to determine the overcurrent warning threshold:

$$OCW1 = UserCap * PSUEff / 12.2 / \text{Active (Healthy) PSU Count}$$

Where
UserCap is a user power cap setting
PSUEff is the power supply unit efficiency
Active (Healthy) PSU Count is the number of active healthy power supply units In this example, the calculated overcurrent warning threshold OCW1 may be out of range of the acceptable threshold value. If so, then the maximum or minimum value PSU threshold can be used instead.

The present disclosure thus provides a number of important technical features. One technical feature is a method to provide the ability to maintain a user power cap based protection level during BMC reboot without reducing power more than necessary. Another technical feature is a system and method to provide a secondary implementation for BMC reboot.

FIG. 1 is a diagram of a system 100 for polling devices over an inter-integrated circuit (I2C) bus or other suitable buses, in accordance with an example embodiment of the present disclosure. System 100 includes remote access control system 102, central processing units (CPUs) 104 and 106, power supply units (PSUs) 108 and 110, CPU voltage regulators (V-CPUs) 112 and 114, memory voltage regulators (V-MEMs) 116 and 118, current monitor 120, and communications ports 122 through 132, each of which can be implemented in hardware or a suitable combination of hardware and software.

Remote access control system 102 is used to poll the associated components and subsystems of system 100, install firmware and perform other functions, and can be an iDRAC or other suitable controllers. In one example embodiment, the disclosed algorithms for polling multiple components, installing firmware and performing other functions can be implemented using object oriented programming or other suitable programming paradigms that allow polling algorithms operating on other systems and components of system 100 to be controlled in a coordinated manner.

CPUs 104 and 106 can be general purpose CPUs, and include one or more power control algorithms that can include user-selectable configuration settings, such as maximum and minimum power settings, thermal settings, frequency settings or other suitable settings. Each CPU can thus implement its own power control scheme, independent of the overall system power control, and can respond to polls, update firmware and perform other functions in conjunction with remote access control system 102.

PSUs 108 and 110 can be power supplies, and include one or more polling response algorithms, firmware update algorithms and other suitable functionality that operates in conjunction with remote access control system 102.

CPU voltage regulator (V-CPU) 112 and 114 are used to control the voltage provided to a corresponding CPU, such as one of CPUs 104 and 106. V-CPU 112 and 114 include one or more polling response algorithms, firmware update algorithms and other suitable functionality that operates in conjunction with remote access control system 102.

Memory voltage regulator (V-MEM) 116 and 118 are used to control the voltage provided to a corresponding memory unit. V-MEM 116 and 118 include one or more polling response algorithms, firmware update algorithms and other suitable functionality that operates in conjunction with remote access control system 102.

Current monitor 120 monitors electrical current provided to one or more system components, such as CPUs 104 and 106, PSU 108 and 110, V-CPU 112 and 114, V-MEM 116 and 118 or other suitable components. Current monitor 120 includes one or more polling response algorithms, firmware update algorithms and other suitable functionality that operates in conjunction with remote access control system 102.

Communications ports 122 through 132 are used to provide communications between remote control access system 102 and other components of system 100. In one example embodiment, communications ports 122 through 132 can use the server message block (SMB) communications protocol, an I2C bus or other suitable communications protocols.

In operation, remote access control system 102 is configured to poll the separate systems and components of system 100, install firmware and perform other suitable functions as discussed herein.

Figure 2:
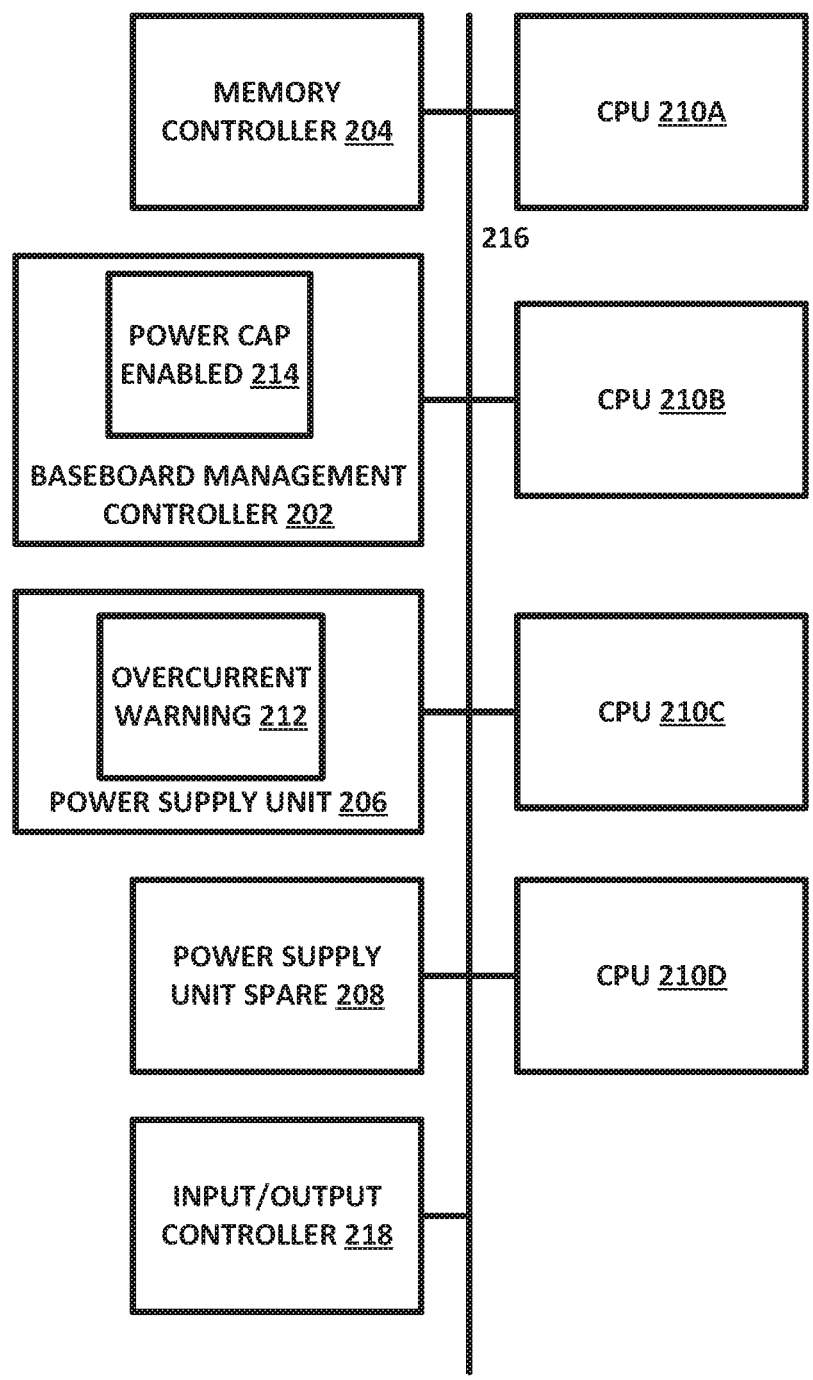
FIG. 2 is a diagram of a system for maintaining a power cap during a BMC reboot, in accordance with an example embodiment of the present disclosure.

FIG. 2 is a diagram of a system 200 for maintaining a power cap during a BMC reboot, in accordance with an example embodiment of the present disclosure. System 200 includes baseboard management controller 202 with power cap enabled system 214, memory controller 204, power supply unit 206 with overcurrent warning system 212, power supply unit spare 208, CPUs 210A through 210D, bus 216 and input/output controller 218, each of which can be implemented in hardware or a suitable combination of hardware and software.

Baseboard management controller 202 includes a processor and firmware to implement one or more algorithms for managing the interface between system management software applications and platform hardware of system 200. In one example embodiment, baseboard management controller can implement a power cap algorithm in conjunction with processors operating on other components of system 200.

Overcurrent warning system 212 operates in conjunction with one or more current sensors to monitor current use by components of system 200. In one example embodiment, overcurrent warning system 212 can monitor a power supply unit 206 current load and can implement adjustable settings related to the current load, such as maximum and minimum current settings, to generate an overcurrent warning.

Power cap enabled system 214 is configured to implement a power cap control for maintaining a power cap during a BMC reboot. In one example embodiment, power cap enabled system 214 can operate on one or more processors to maintain a power cap during a BMC reboot, such as by implementing overcurrent threshold settings from a power supply unit or in other suitable manners.

Memory controller 204 includes a processor and firmware that allows control of memory devices, such as to read and write data to and from a memory. Memory controller 204 can operate in conjunction with baseboard management controller 202, power supply unit 206, CPUs 210A through 210D or other suitable components.

Power supply unit 206 includes a processor and firmware that allows power supply unit 206 to implement one or more control algorithms for maintaining a power cap during a reboot of baseboard management controller 202 or other components on system 200. In one example embodiment, power supply unit 206 can include one or more current sensors, one or more overcurrent warning systems and other suitable sensing and control functionality.

Power supply unit spare 208 provides backup power supply functionality, such as to ensure power supply availability during a reboot or if the main power supply unit 206 otherwise is unavailable.

CPUs 210A through 210D each include a processor and firmware that facilitate general purpose operations. The power consumed by CPUs 210A through 210D can be adjusted or capped, as needed.

Bus 216 can be an I2C bus or other suitable communication media. In one example embodiment, bus 216 can be used to read power consumption data from components of system 200, where communication signals between power supply unit 206, power supply unit spare 208, CPUs 210A through 210D and other components are provided by discrete signals (such as high-low signaling).

Input/output controller 28 includes a processor and firmware that facilitates general purpose input and output operations.

In operation, system 200 provides a system and method to maintain a power cap during a baseboard management controller reboot, such as by configuring an overcurrent warning setting of a power supply unit. System 200 thus allows the power cap settings to be maintained during a baseboard management controller reboot using other components of system 200.

Figure 3:
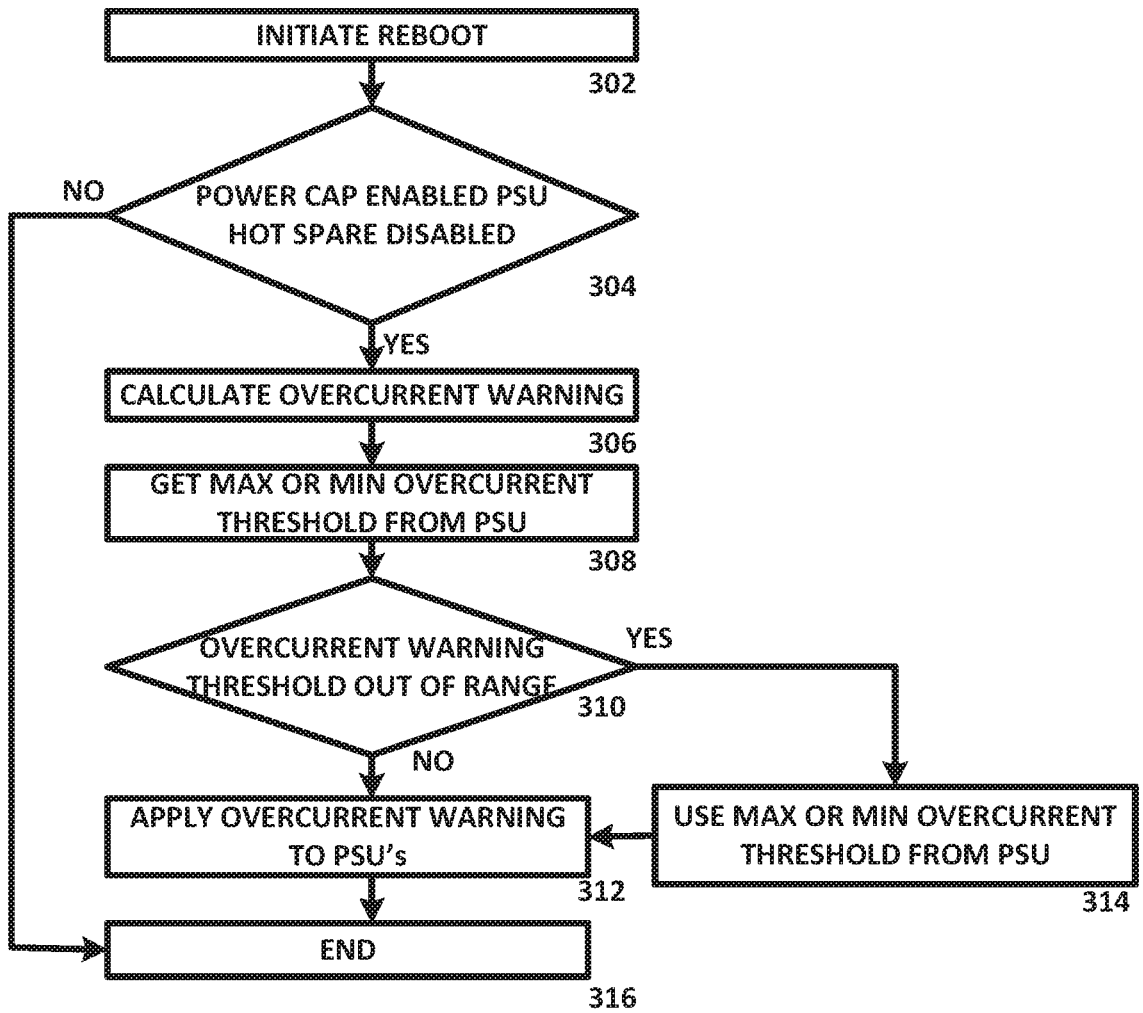
FIG. 3 is a diagram of an algorithm for maintaining a power cap during a BMC reboot, in accordance with an example embodiment of the present disclosure.

FIG. 3 is a diagram of an algorithm 300 for maintaining a power cap during a BMC reboot, in accordance with an example embodiment of the present disclosure. Algorithm 300 can be implemented on two or more processors.

Algorithm 300 begins at 302, where a reboot is initiated. The algorithm then proceeds to 304.

At 304, it is determined whether a power cap has been enabled and a PSU hot spare has been disabled. If it is determined that the power cap has not been disabled and that the PSU hot spare has been disabled, the algorithm proceeds to 312 and terminates, otherwise the algorithm proceeds to 306.

At 306, an overcurrent warning is configured, such as an overcurrent warning for a power supply unit or other suitable devices. In one example embodiment, the following algorithm can be used to configure the overcurrent warning:

$$OCW1 = UserCap * PSUEff / 12.2 / Active\ (Healthy)\ PSU\ Count$$

Where
UserCap is a user power cap setting
PSUEff is the power supply unit efficiency
Active (Healthy) PSU Count is the number of active healthy power supply units
Other suitable algorithms can also or alternatively be used, such as to set the overcurrent warning to a suitable value to allow the baseboard management controller to reboot without causing the circuit breaker to trip. The algorithm then proceeds to 308.

At 308, the maximum or minimum overcurrent threshold is obtained from the power supply unit or other suitable devices. The algorithm then proceeds to 310.

At 310, it is determined whether the overcurrent warning threshold is out of range. If it is determined that the threshold is not out of range, the algorithm proceeds to 314, where the maximum or minimum overcurrent threshold that was obtained from the power supply unit or other suitable devices is applied, otherwise the algorithm proceeds to 312.

At 312, the overcurrent warning is applied to the power supply unit(s), and the algorithm proceeds to 316 and terminates.

In operation, algorithm 300 allows an overcurrent warning to be modified to maintain a power cap during a BMC reboot. While algorithm 300 is shown as a flow chart, it can also or alternatively be implemented as two or more flow charts, one or more objects or agents, one or more state diagrams, on one or more processors or other devices, or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling power to a complex system, comprising:
   a plurality of processors;
   one or more power supply unit, each power supply unit including an overcurrent warning system; and
   a baseboard management controller coupled to the plurality of processors and the one or more power supply unit, wherein the baseboard management controller is configured to determine whether a power cap control has been enabled and to adjust an overcurrent warning threshold of the overcurrent warning system, wherein the baseboard management controller is configured to determine whether the overcurrent warning threshold is outside of a range of acceptable threshold values and to apply a calculated overcurrent warning threshold if the overcurrent warning threshold is outside of the range.

2. The system of claim 1 wherein the baseboard management controller is configured to calculate the overcurrent warning threshold as a function of a user-selected power capacity setting.

3. The system of claim 1 wherein the baseboard management controller is configured to calculate the overcurrent warning threshold as a function of a number of active power supply units.

4. The system of claim 1 wherein the baseboard management controller is configured to calculate the overcurrent warning threshold as a function of a power supply efficiency.

5. The system of claim 1 wherein the baseboard management controller is configured to obtain the overcurrent warning threshold from a power supply unit if the overcurrent warning threshold is outside of the range.

6. A method for controlling power to a complex system, comprising:
   receiving a reboot initiation signal at a baseband management controller;
   determining whether a power cap control has been enabled at the baseband management controller;
   adjusting an overcurrent warning threshold of an overcurrent warning system of a power supply unit if the power cap control has been enabled;
   determining whether the overcurrent warning threshold is outside of a range of threshold values; and
   applying a calculated overcurrent warning threshold if the overcurrent warning threshold is outside of the range.

7. The method of claim 6 further comprising calculating the overcurrent warning threshold as a function of a user-selected power capacity setting.

8. The method of claim 6 further comprising calculating the overcurrent warning threshold as a function of a number of active power supply units.

9. The method of claim 6 further comprising calculating the overcurrent warning threshold as a function of a power supply efficiency.

10. The method of claim 6 further comprising:
    obtaining the overcurrent warning threshold from a power supply unit if the overcurrent warning threshold is outside of the range.

11. A system for controlling power to a complex system, comprising:
    a plurality of processors;
    one or more power supply unit, each power supply unit including an overcurrent warning system; and
    a baseboard management controller coupled to the plurality of processors and the one or more power supply unit, wherein the baseboard management controller comprises means for determining whether a power cap control has been enabled and to adjust an overcurrent warning threshold of the overcurrent warning system, wherein the baseboard management controller further comprises means for determining whether the overcurrent warning threshold is outside of a range of threshold values and to apply a calculated overcurrent warning threshold if the overcurrent warning threshold is outside of the range.

12. The system of claim 11 wherein the baseboard management controller further comprises means for calculating the overcurrent warning threshold as a function of a user-selected power capacity setting.

13. The system of claim 11 wherein the baseboard management controller further comprises means for calculating the overcurrent warning threshold as a function of a number of active power supply units.

14. The system of claim 11 wherein the baseboard management controller further comprises means for calculating the overcurrent warning threshold as a function of a power supply efficiency.

15. The system of claim 11 wherein the baseboard management controller further comprises means to obtain the overcurrent warning threshold from a power supply unit if the overcurrent warning threshold is outside of the range.

* * * * *